March 28, 1933. M. L. GIANOLI 1,903,039
DEVICE FOR INTERLOCKING TWO MOVEMENTS
Filed June 2, 1930 3 Sheets-Sheet 1

M. L. Gianoli
INVENTOR

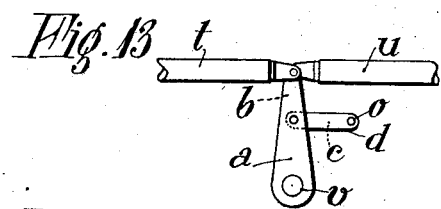
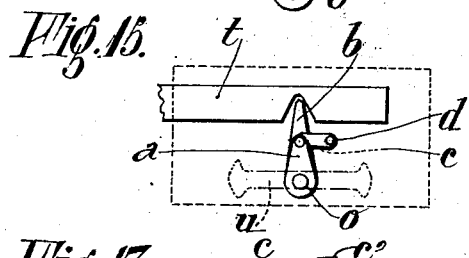
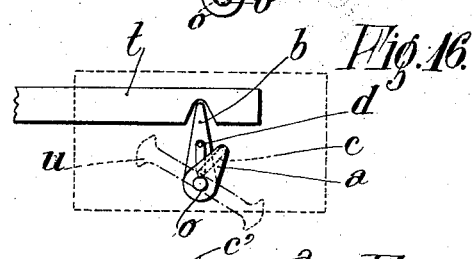
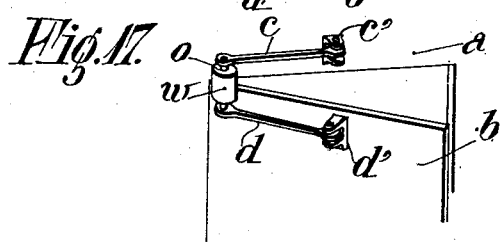
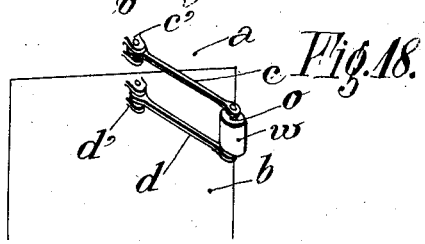
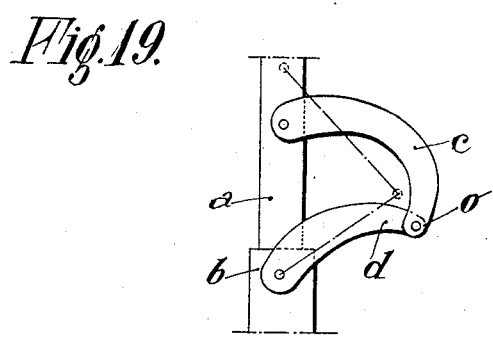
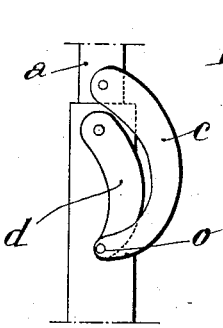
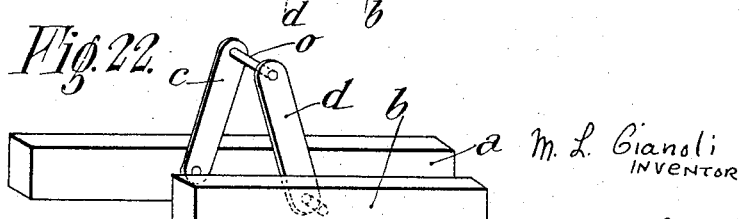

March 28, 1933. M. L. GIANOLI 1,903,039
DEVICE FOR INTERLOCKING TWO MOVEMENTS
Filed June 2, 1930 3 Sheets-Sheet 3

Patented Mar. 28, 1933

1,903,039

UNITED STATES PATENT OFFICE

MARCEL LOUIS GIANOLI, OF PARIS, FRANCE

DEVICE FOR INTERLOCKING TWO MOVEMENTS

Application filed June 2, 1930, Serial No. 459,004, and in France June 7, 1929.

This invention, relates generally speaking, to a device for interlocking two movements.

It has for its main object a device for connecting two members guided on trajectories situated in parallel planes and such that their orthogonal projections on one of these planes admit at least one point of tangency, characterized by two links pivotally connected to each other and on each of the members by axes perpendicular to the planes of the trajectories, the pivoting axes on the members being capable of coming in alignment with each other and of passing through the above mentioned point of tangency, so that, at this moment, both links can simultaneously rotate relatively to the two members they connect and thus be brought either in a position allowing a relative movement of both members, or in a position preventing this movement.

The invention has also for an object to ensure the locking of both members relatively to each other by bringing the links in a direction parallel to the common direction of the movement of both members, or approximately in such a direction.

The invention also relates to other points which will be indicated in the description given hereinafter with reference to the accompanying drawings, in which.

Figure 1:
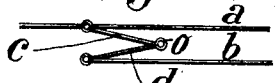
Fig. 1 illustrates two translations in the connected position.
Figure 3:
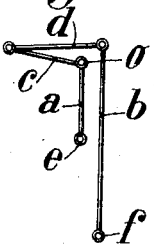
Figs. 3 and 4 illustrate the connection of two rotations.
Figure 4:
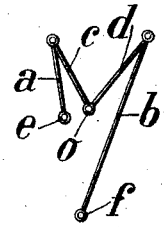
Figure 2:
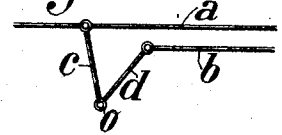
Fig. 2 shows the same independent from each other.
Figure 5:
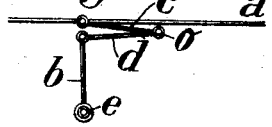
Figs. 5 and 6 show the connection of a translation and of a rotation.
Figure 6:
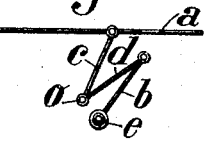
Figure 7:
Figs. 7 to 10 illustrate a system of connection of two rotations.
Figure 8:
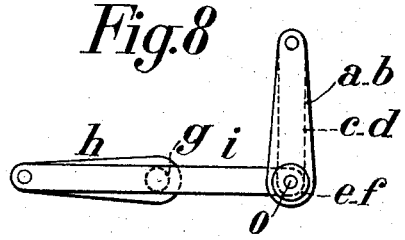
Figure 9:
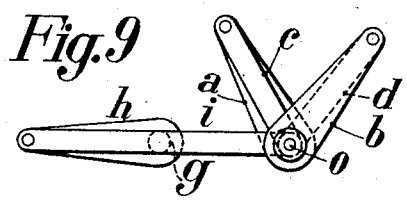
Figure 10:
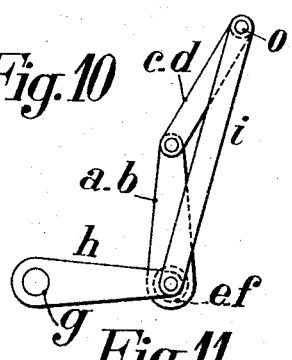
Figure 12:
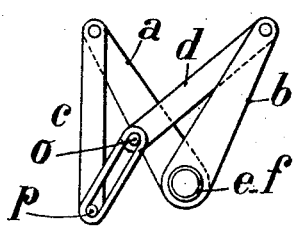
Figure 11:
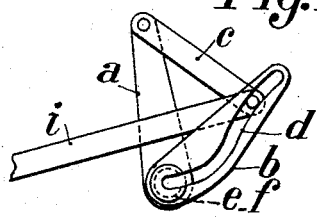

Figs. 11 and 12 respectively illustrate two modifications of the form of construction shown in Figs. 7 to 10.

Figs. 13 and 14 illustrate in locked position and unlocked position two members of any control apparatus.

Figs. 15 and 16 illustrate, in locked position and unlocked position, the various parts of a lock constructed in accordance with the invention.

Fig. 17 illustrates a Blount device combined with a door.

Fig. 18 is a corresponding view, the Blount device being placed for ensuring the locking of the door.

Figs. 19 and 20 illustrate, an unlocking position and locking position, two telescopic elements.

Figs. 21 and 22 illustrate a device for interlocking two movements on a machine.

Figure 23:
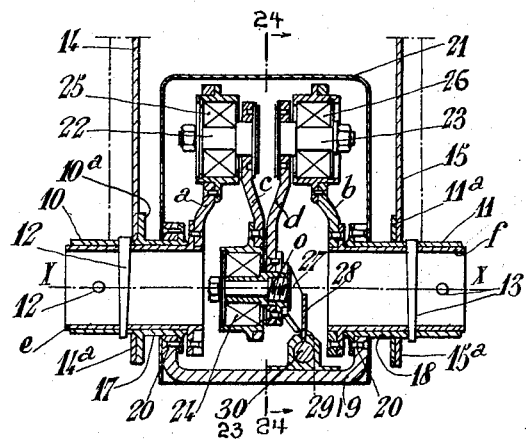
Figure 24:
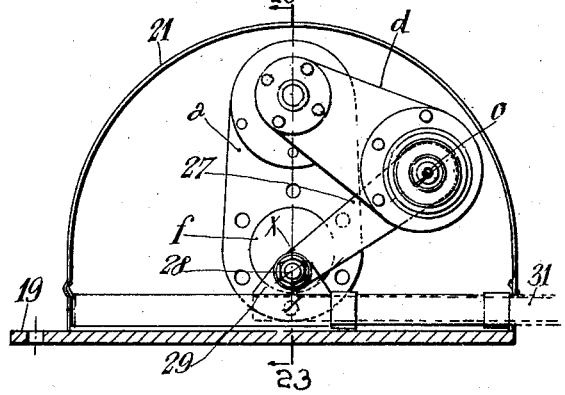

Fig. 23 is a longitudinal section through a form of the invention applied to use, the section being taken on the line 23—23 of Fig. 24.

Fig. 24 is a vertical section on the line 24—24 of Fig. 23.

Figure 25:
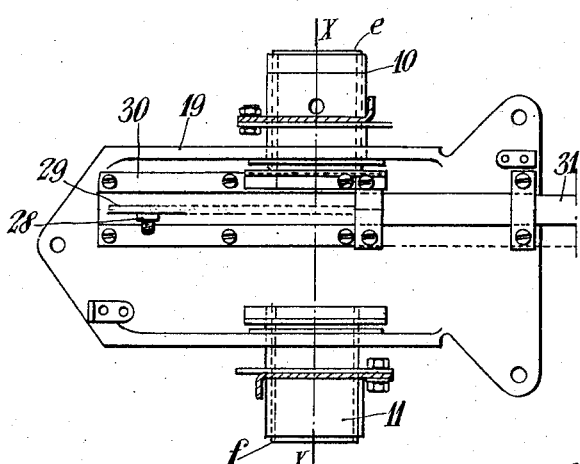

Fig. 25 is a top plan view of the device with the levers $a$ and $b$ and links $c$ and $d$ and the casing removed.

Referring to Figs. 1 to 6, $a$ and $b$ designate the two members to be connected and capable, either of a translation along their axis, or of a rotation respectively about points $e$ and $f$.

$c$ and $d$ designate intermediate members pivoted, on the one hand, on the members $a$ and $b$, on the other hand, together at $c$.

It will be seen that $a$ and $b$ are integral together when $c$ and $d$ form with the trajectories angles smaller than 90°, and are independent when at least one of these angles is equal to 90°.

Figs. 7, 8, 9 and 10 illustrate a particular form of execution for obtaining the connection of two rotations allowing the full displacements of the two members, connected or not, and a control method eliminating stresses in the operating members.

$a$ and $b$ designate two members pivoted about $e$ and $f$; these members carry, at their free ends, the pivots of the intermediate links $c$ and $d$, which are pivoted together at $o$; both links have identical lengths equal to the length of the radius of $a$ and $b$. A control comprising a link $i$ operated by a crank $h$ pivoted at $g$, allows of bringing the point $o$ either in coincidence with the mingled axes $e$ and $f$, or at any different point, the pivot of $i$ on $h$ being in its turn, in this case, in coincident with $e$ and $f$, so as to allow the complete rotations of *a* and *b* without displacement of the control.

Figs. 9 and 10 show that *a* and *b* are independent when the pivot *o* coincides with the axes *e* and *f*, and that as soon as *o* is situated outside these two axes, the members *a* and *b* are integral together.

Fig. 11 illustrates a modification of the preceding form of execution in which one of the links is replaced by a slide guiding the other link. This modification is applicable to all the connections previously indicated, over which it presents this advantage that, without play, the connection can first bring both systems in connected position. This modification is simply a kinematic realization of connection different from that represented by the link; one of its advantages is to allow, by the shape of the slide, of modifying the rapidity, the displacements of the stress of the operations (this stress is null in the case shown in Figs. 7, 8, 9 and 10, the displacements of the point *o* being always normal to the forces).

Fig. 12 shows a modification of the system shown in Figs. 7 to 10; in this modification the mutual connection of both links presents a resilient play obtained, for instance, by means of a spring, of a rubber bond, of a weight, etc. This modification allows to progressively throw one of the rotations in engagement with the other, the stress transmitted being proportional to the spacing apart of the common axes *e* and *f*, on the one hand, and the resilient joint *op*, on the other hand, and the driving action becoming imperative, that is to say, the speeds of rotation becoming equal only at the time this spacing apart becomes equal to that permitted by the maximum play between *o* and *p*.

Figs. 13 and 14 respectively illustrate a distant control in engaged and disengaged position. This device comprises two links *t* and *u*, in the ends of which are journalled levers *a* and *b* pivoted about a common axis *v*. On the levers *a* and *b* are respectively pivoted other levers *c* and *d* journalled about a common axis *o*. In the position illustrated in Fig. 13, the levers *c* and *d* are so arranged as to form an angle of about 90° with the levers *a* and *b*, so that any angular displacement of *a* relatively to *b* is impossible. Both members *t* and *u* are then engaged together. On the contrary, in any other positions that then previously indicated of the two levers *c* and *d* the rods *t* and *u* can move independently of each other. Preferably, the pivot *o* is brought in alignment with the axis *v* for facilitating the displacement of the rods *t* and *u*.

The device previously indicated is more particularly utilizable for effecting the disengagement of a distant control and finds its application on airplanes, boats, switch boxes, etc.

The lock illustrated in Figs. 15 and 16 is constructed in accordance with the present invention; the two members to be engaged together or to be disengaged are the bolt *t* and the handle *u*. Between these two members is arranged a kinematic device constituted by levers *a*, *b*, *c* and *d*, the operation being similar to that previously indicated.

Figs. 17 and 18 illustrate a constructional modification in which use is made of a device of the Blount type, constituted by two levers *c* and *d* pivoted about an axis *o* forming a part of a resilient box *w* known per se. The levers *c* and *d* are pivoted in fork pieces mounted, one *c'* on the door-case, the other *d'* on the door itself. By bringing the levers *c* and *d* at right angles to the door, the latter is locked.

In the form of construction illustrated in Figs. 19 and 20, the locking of two telescopic tubes *a* and *b* is effected by bringing the common pivot *o* of the levers *c* and *d* as illustrated in Fig. 20. Such a device can be used, generally speaking, for any telescopic elements, and particularly for telescopic tubes of a collapsible landing chassis of an airplane.

Figs. 21 and 22 illustrate, by way of example only, a device for engaging together two elements of any nature, and particularly two members of a weaving frame. In Fig. 21, the member *a* receives a reciprocating movement of translation and drives the member *b*. On the contrary, in Fig. 22, the member *a* no longer actuates the member *b*. The levers *c* and *d*, the suitable position of which allows the engagement or disengagement of the elements *a* and *b*, can be actuated by any suitable means.

Referring to Figs. 23–25 wherein a practical embodiment of the invention is illustrated in detail, two coaxial shafts *e* and *f* are provided with sleeves 10 and 11 rigidly secured to the shafts by pins 12 and 13. The sleeves 10 and 11 are provided with flanges 10*a* and 11*a* to which are soldered corresponding flanges 14*a* and 15*a* of two arms 14 and 15 constituting for instance the two handles forming part of the control of an airplane. The shafts *e* and *f* are journalled in bearings 17 and 18 rigidly mounted on a plate 19 by rivets 20. The plate 19 is secured to the floor of the piloting station by any suitable means, a casing 21 protecting the entire mechanism, which comprises a lever *a* rigidly secured to the shaft *e*, a lever *b* rigidly secured to the shaft *f*, two links *c* and *d* pivoted about a common axis *o*, the link *c* being pivoted to the lever *a* at 22 and the link *d* to the lever *b* at 23.

The various joints are mounted on ball bearings shown diagrammatically at 24, 25 and 26.

Moreover, it may be stated that the distances of the axes 22 and 23 relative to the axis *o* are equal to the distances of these axes 22 and 23 relative to the axis XX.

The axis *o* may be brought into coincidence with the axis XX (the position permitting relative movement of the two shafts *e* and *f* shown in Fig. 23) or in the position shown in Fig. 24 wherein the axis *o* does not coincide with the axis XX (the locked position of the two shafts *e* and *f*).

The means for displacing the axis *o* may vary considerably, as will be evident from the foregoing. In the example illustrated in Figures 23, 24 and 25, there is used a link 27 pivoted, on the one hand, about the axis *o* and on the other hand, about an axis 28 mounted on a member 29. The member 29 carrying the axis 28 is placed in a guide 30 and displaced longitudinally by means of a rod or a screw 31.

The above-described apparatus may be used as a locking means between two shafts *e* and *f*. In the example shown, this interlocking device is more particularly utilizable for coupling and uncoupling a dual control on board an airplane.

It is obvious that the forms of construction described and illustrated are simple examples capable of receiving many modifications, which as long as they do not alter the main features above set forth and the object sought for, remain including in the scope of the invention.

What I claim as my invention and desire to secure by Letters Patent is:

1. In a device for connecting two members journalled about one and the same axis, two links pivoted together and on each of the members by axes perpendicular to the planes of the trajectories, the distances between the pivoting axes of the links on the two members and the common pivoting axis of both links, as well as the pivoting axis of both members, being equal, a crank having a length equal to the distance separating its pivoting point from the pivoting axis of both members, a connecting rod connected to the crank and to the common pivoting axis of both links, for allowing to bring either the common pivoting axis of the connecting rod and of both links in coincidence with the common pivoting axis of both members, in order to permit the displacement of both members relatively to each other, or the pivoting axis of the crank and of the connecting rod in coincidence with the pivoting axis of both members, in order to ensure the locking of the latter relatively to each other.

2. In a device for connecting two members journalled about one and the same axis, two links pivoted together at one of their ends and pivoted at their other ends on each of the said members by axes perpendicular to the planes of the trajectories, the distances between the pivoting axes of the links on the two members and the common pivoting axis between the two links as well as the pivoting axis of both members being equal, means for bringing the common pivoting axis of both links in coincidence with the common pivoting axis of both members in order to permit the displacement of both members relatively to each other, said means being also adapted to bring the common pivoting axis of both links to a position displaced from the said point of coincidence with the common pivoting axis of both members for preventing displacement of the two members.

3. A device for connecting two members journalled about the same axis, two links pivoted at one of their ends each to one of the members, means resiliently connecting the other ends of the links, the distance between the pivotal connection of the links with the members and the resiliently connected ends of the links corresponding with the distance between the axis of said members and the points of connection of said members with the links, the resiliently connected ends of the links being movable into substantially coaxial relation with the axis of said members to permit rotation of said members relative to each other.

4. In a device for connecting two members journalled about the same axis, one of said members having a slide extending through and beyond its pivoting axis, a link pivoted at one end to the free end of the other member, a guide member carried by said link and engaging said slide, and means for moving the guide member into coaxial relation to the axis of rotation of said members to permit free rotation of the latter.

5. In a device for connecting two members journalled about the same axis, means connecting said members and having a plurality of pivotal points, at least one of said pivotal points being movable to a position coaxial with the axis of said members to permit free rotation of the latter and acting, when moved to an eccentric position, to lock said members against movement.

In testimony whereof I have signed this specification.

MARCEL LOUIS GIANOLI.